United States Patent [19]
Crowley

[11] 4,370,653
[45] Jan. 25, 1983

[54] PHASE COMPARATOR SYSTEM

[75] Inventor: Albert T. Crowley, Gloucester Township, Camden County, N.J.

[73] Assignee: RCA Corporation, New York, N.Y.

[21] Appl. No.: 170,998

[22] Filed: Jul. 21, 1980

[51] Int. Cl.³ ............................................. G01S 13/78
[52] U.S. Cl. .............................. 343/6.5 LC; 343/7 PL
[58] Field of Search .............. 343/6.5 LC, 7 PL, 7 A; 328/155

[56] References Cited

U.S. PATENT DOCUMENTS

| | | |
|---|---|---|
| 3,183,506 | 5/1965 | Webb . |
| 3,199,104 | 8/1965 | Miller . |
| 3,243,811 | 3/1966 | Hose . |
| 3,341,845 | 9/1967 | Deman ........................ 343/6.5 LC |
| 3,449,691 | 6/1969 | Pasternack et al. . |
| 3,530,467 | 9/1970 | Attwood et al. ......... 343/6.5 LC X |
| 3,530,470 | 9/1970 | Sheftelman et al. . |
| 3,730,628 | 5/1973 | Wolcott et al. . |
| 3,778,160 | 12/1973 | Wolcott . |
| 3,959,793 | 5/1976 | Litchford . |
| 4,011,562 | 3/1977 | Bruce . |
| 4,045,796 | 8/1977 | Kline, Jr. . |
| 4,072,947 | 2/1978 | Johnson . |
| 4,074,267 | 2/1978 | Knox . |
| 4,107,684 | 8/1978 | Watson, Jr. . |
| 4,128,835 | 12/1978 | Russell ........................ 343/6.5 LC |
| 4,144,572 | 3/1979 | Starner et al. . |
| 4,166,249 | 8/1979 | Lynch .................................. 328/155 |
| 4,190,807 | 2/1980 | Weber ............................ 328/155 X |
| 4,278,977 | 7/1981 | Nossen ........................ 343/6.5 LC |

Primary Examiner—T. H. Tubbesing
Attorney, Agent, or Firm—Samuel Cohen; Joseph S. Tripoli; Donald W. Phillion

[57] ABSTRACT

An improved interrogation means in a range finding system having signal generating means for generating interrogation signals having a first encoded portion and a first basic tone portion. A transponder means responds to said interrogation signal to generate and transmit a responsive signal having a second encoded portion and a second basic tone portion phase synchronous with said first encoded and basic tone portions as received at the transponder. The interrogator means has further means for storing the phases of the first encoded and basic tone portions after transmission thereof and other means for determining the difference between the stored phase of the first encoded portion and the phase of the received second encoded portion. A third means determines the difference between the stored phase of the first basic tone portion and the phase of the received second basic tone portion to produce a first signal whose frequency is proportional to said phase difference and a second signal indicating the leading or lagging phase relationship of said first and second basic tones. Up/down counter means counts at a rate determined by the frequency of said first signal and in a direction determined by said second signal. The signal generating means responds to the count in said up/down counter to alter the stored phase of said first basic tone portion to become phase synchronized with the phase of said received second basic tone.

8 Claims, 10 Drawing Figures

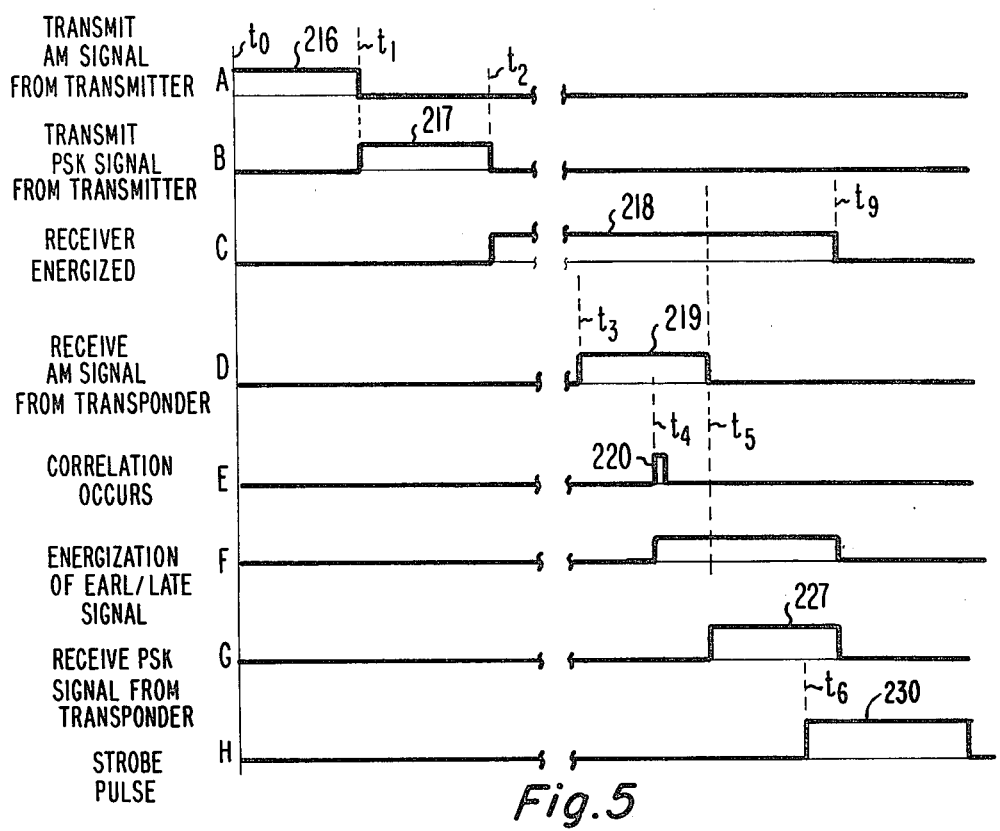

PHASE COMPARATOR SYSTEM

The United States Government has rights in this invention pursuant to Contract No. u/F33562-78-C-0177, awarded by the Department of the Air Force.

This invention relates generally to phase comparing means for determining the phase difference between two signals and more particularly, to a phase comparator means, such as employed in a range finding system, for determining the phase difference between an encoded received signal and a locally generated encoded signal substantially identical to the received encoded signal.

Phase comparators are employed in many applications. Some comparators are analog and others are digital. Some types of range determining systems are, in fact, phase comparators. In these systems an interrogator generates and transmits an encoded signal to a transponder. In one such system disclosed in U.S. Pat. No. 4,278,977, issued July 14, 1981 to Edward J. Nossen, entitled "Range Determining System," and assigned to the same assignee as the present invention, an encoded interrogation signal is transmitted which consists of at least two portions, the first portion comprising a two level pseudo random sequence (PRS) having level transitions coincident with the level transitions of a two level tone of frequency $f_t$, and having a second portion consisting of said two level tone of frequency $f_t$. A receiver, commonly known as a transponder, is constructed to receive such interrogation signal and to generate and transmit a responsive encoded signal phase coincident with the received interrogation signal and also having a pseudo random sequence portion and a two level tone portion of frequency $f_t$. The received interrogation signal has of course been delayed by the time required to propogate from the interrogator to the transponder, which time represents the distance therebetween. The transponder then generates and transmits the response encoded signal back to the interrogator, again delayed by the propagation time therebetween. The interrogator is constructed to receive the encoded signal from the transponder and to compare such received signal with the original signal transmitted to the transponder, the phase of such original signal having been preserved. The phase difference between the signal preserved at the interrogator and the signal received back from the transponder is translated into time and subsequently into the round trip distance between the interrogator and transponder.

Such prior art employs an arithmetic frequency synthesizer at the interrogator which produces an output signal phase synchronous with the encoded signal received from the transponder. The signal generated in the arithmetic frequency synthesizer at the interrogator is then compared with the preserved originally transmitted signal to determine the phase difference therebetween and thus the distance between interrogator and transponder.

Arithmetic frequency synthesizers are costly and involve considerable logic. For a detailed discussion of an arithmetic frequency synthesizer, reference is made to U.S. Pat. No. 3,689,914, issued Aug. 29, 1972, to Butler, entitled "Waveform Generator" and incorporated herein by reference.

In the system of the aforementioned patent application, the pseudo random sequence has a period sufficiently long so that the propagation time of the encoded signal from the interrogator to the transponder and back is less than the said period of a pseudo random sequence.

The prior art described generally above can be employed to determine the phase difference between a locally generated tone of frequency $f_t$ and any received tone of frequency $f_t$, regardless of how or where such received tone originated, and in the absence of any PRS component. It is not necessary that the phase comparing system be employed in a range determining system. Such an application is only one of many possible uses.

In a preferred form of the invention first means comprising signal generating means generates and transmits an encoded interrogation signal and second means receives a similarly encoded response signal from a transponder. The interrogation and response signals both comprise at least two portions, the first portion comprising one or more successive PRS signals and the second portion a basic tone. Third means determines the phase difference between the PRS portions of the interrogation and response signals to determine gross range and fourth means determines the phase difference between the basic tones of the interrogation signal as originally transmitted and the received response signal to determine precise range. The said fourth means comprises a means responsive to the phase difference between said basic tones to produce a first signal having a frequency proportional to said phase difference and a second signal indicating the leading or lagging phase relationship of said basic tones. An up/down counter counts at a rate and in a direction in response to said first and second signals, respectively. The said signal generating means responds to the count in said up/down counter to phase shift the basic tone of the interrogation signal towards the phase of the received basic tone until phase synchronization occurs therebetween. Other means reads and interprets the contents of said up/down counter to determine the precise range.

In the drawings:

FIG. 5 is a set of bar waveforms showing the time relationships between the portions of the interrogation and response signals;

Figure 7:
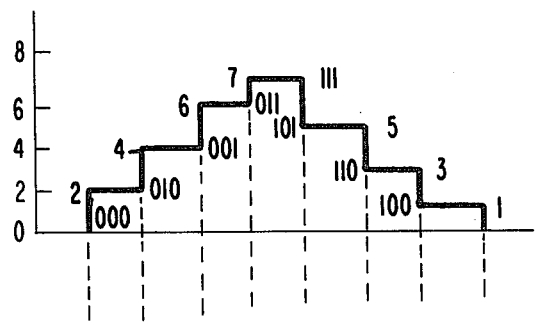
Figure 9:
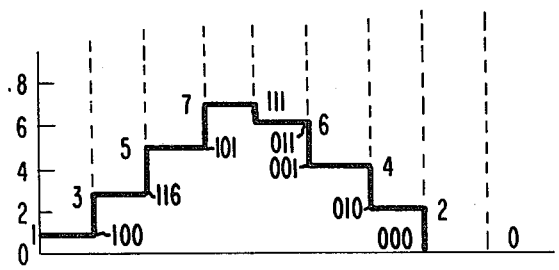

FIGS. 6 and 8 are truth tables showing the phase shift in terms of digital words of the locally generated basic tone as its phase is shifted towards that of the received basic tone; and FIGS. 7 and 9 show the analog signals produced from the digital words of the truth tables of FIGS. 6 and 8.

Before discussing the diagrams of FIGS. 3 and 4, the nature of the encoded signals employed in the invention and their time relationship will first be discussed. Such background will provide an easier understanding of FIGS. 3 and 4.

Figure 1A:
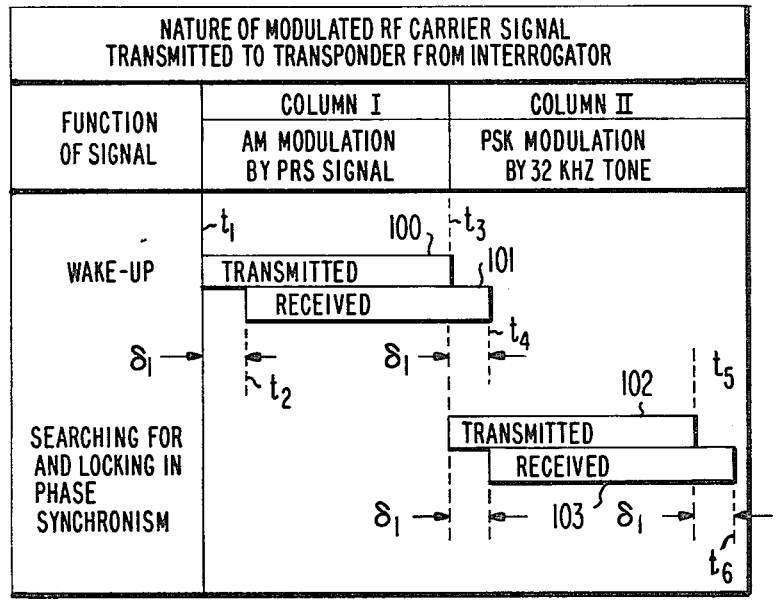
FIGS. 1A and 1B are bar waveforms showing the times of transmission and the times of reception of signals between the interrogator and the transponder.

FIG. 1A is a bar chart showing the time relationship between the transmitted interrogation signal and such transmitted signal as received at the transponder. More specifically, bar 100 represents the time period of the first portion of the transmitted signal which consists of a carrier signal amplitude modulated by the PRS signal. Such first portion of the transmitted signal is received at the transponder, not shown herein, at a time period represented as bar signal 101. The time period $\delta_1 = t_2 - t_1$ is the propagation time required for portion 100 of the transmitted signal to reach the transponder.

The second portion of the transmitted signal, which consists of a carrier signal modulated by a basic 32 KHz tone is represented by bar 102. Such portion 102 of the transmitted signal is received at the transponder a time interval $\delta_1$ later and identified as bar 103 of FIG. 1A.

The transponder, which can be any one of several known transponders, including the one described in the above-identified U.S. Pat. No. 4,278,977 generates a response signal and transmits such responsive signal back to the transmitter similar to the interrogation signal. Such responsive signal consists of a first portion 104 comprising a carrier signal which is amplitude modulated by the PRS signal. Such signal portion 104 is received at the interrogator a time interval $\delta_2$ later and identified as bar signal 105 of FIG. 1B.

Figure 1B:
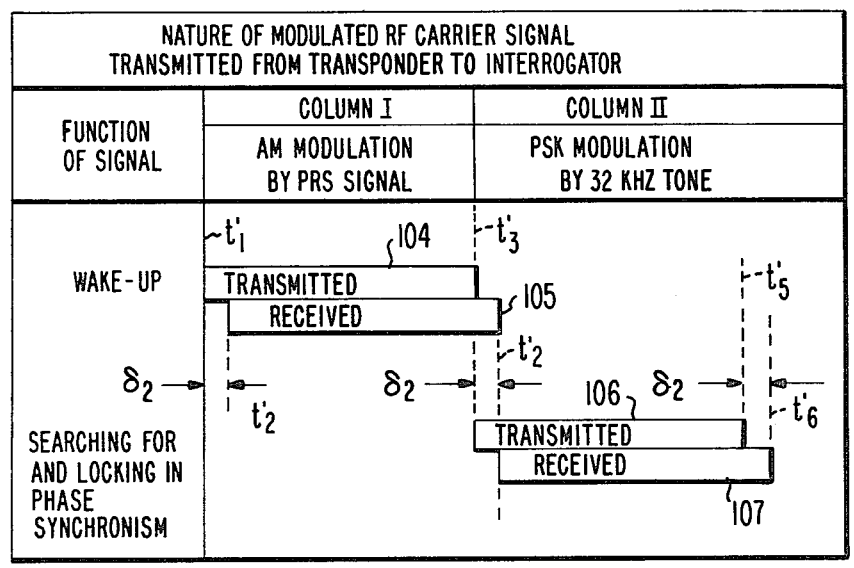

The second portion of the signal generated by the transponder consists of the carrier signal biphase modulated by the basic 32 KHz tone signal represented by bar 106 of FIG. 1B. Such second portion 106 is received at the interrogator a time interval $\delta_2$ later and identified by bar 107 in FIG. 1B. The summation of the time intervals $\delta_1$ and $\delta_2$ is equal to the round trip signal propagation time between the interrogator and the transponder.

Figure 2:
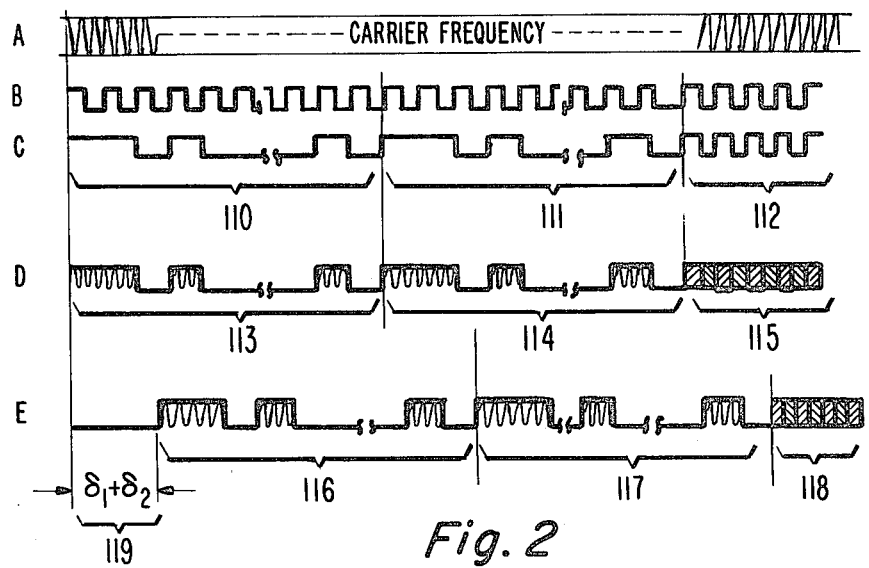
FIG. 2 shows waveforms of the signal components which form the interrogation and response signals of the invention.

Referring now to FIG. 2 there are shown waveforms A through E which, for purposes of convenience, will be referred to herein as waveform 2A, waveform 2B . . . waveform 2E. The waveforms of FIG. 5 will similarly be referred to as waveform 5A, waveform 5B, etc.

Waveform 2A represents the carrier signal of the interrogation and response signals. Waveform 2B represents a basic tone of 32 KHz employed in the system which determines the level transitions of the pseudo random sequence shown in waveform 2C and also provides the modulating signal for the second portion of the interrogation and responsive signals, as shown in signal portions 115 and 118 of waveforms 2D and 2E.

The PRS signal is comprised of code chips which are defined as the smallest possible division of the PRS signal. In the PRS signal of waveform 2C a level transition can occur only on the positive transition of the 32 KHz signal of waveform 2B, from which the PRS signal is derived. Thus a code chip of the PRS signal are equal to the time between two adjacent positive transitions (one cycle) of the 32 KHz tone of waveform 2B.

The waveform 2C shows two periods 110 and 111 of the pseudo random sequence which forms the first portion of the transmitted signal. If desired, more than two pseudo random sequences can be employed. Following the pseudo random sequence portion is a signal portion which consists of the carrier signal biphase modulated by the basic 32 KHz tone frequency. Such basic tone frequency is shown in waveform 2B and in section 112 of waveform 2C. Waveform 2D shows the carrier signal of waveform 2A modulated by the signals represented by waveforms 2C and 2B and is the signal actually transmitted to the transponder. More specifically, the two sections 113 and 114 of waveform 2D represent the carrier signal amplitude modulated by the pseudo random sequence of waveform 2C. The portion 115 of waveform 2D represents the carrier signal biphase modulated by the tone 112 of waveform 2B.

Waveform 2E represents the signal received back from the transponder. It will be noted that the signal of waveform 2E is substantially identical to that of waveform 2D except that it is phase displaced by a time interval $\delta_1 + \delta_2$ which is the round trip propagation time of the signal.

It is to be understood that the propagation time $\delta_1 + \delta_2$ represents only the actual round trip propagation time of the transmitted signal. It does not include the time involved at the transponder in receiving the transmitted signal and then generating a signal in phase therewith, which time is a much greater time than $\delta_1 + \delta_2$. However, such additional time drops out of the calculations inasmuch as the phases of the two portions of the signal of waveform 2D is continuously regenerated at the interrogator after the original interrogation signal has been transmitted and until the responsive signal from the transponder is received back at the interrogator. Thus, while many pseudo random sequences, such as PRS 113, might have been generated at the interrogator while awaiting the return of the response signal from the transponder, when such responsive signal is in fact received it is only the phase displacement within a single pseudo random sequence that has meaning. It is this last mentioned phase displacement that determines the gross distance between the interrogator and the transponder. Once such gross distance has been determined by logic means to be described later herein re FIG. 4 then the fine phase difference between the transmitted and received 32 KHz tone can be determined by means of a phase lock loop (PLL) at the interrogator, also to be described later herein.

Before discussing FIG. 4 which shows a detailed diagram of the invention, the diagram of FIG. 3 will first be described to facilitate an understanding of the more complex diagram of FIG. 4.

Figure 3:
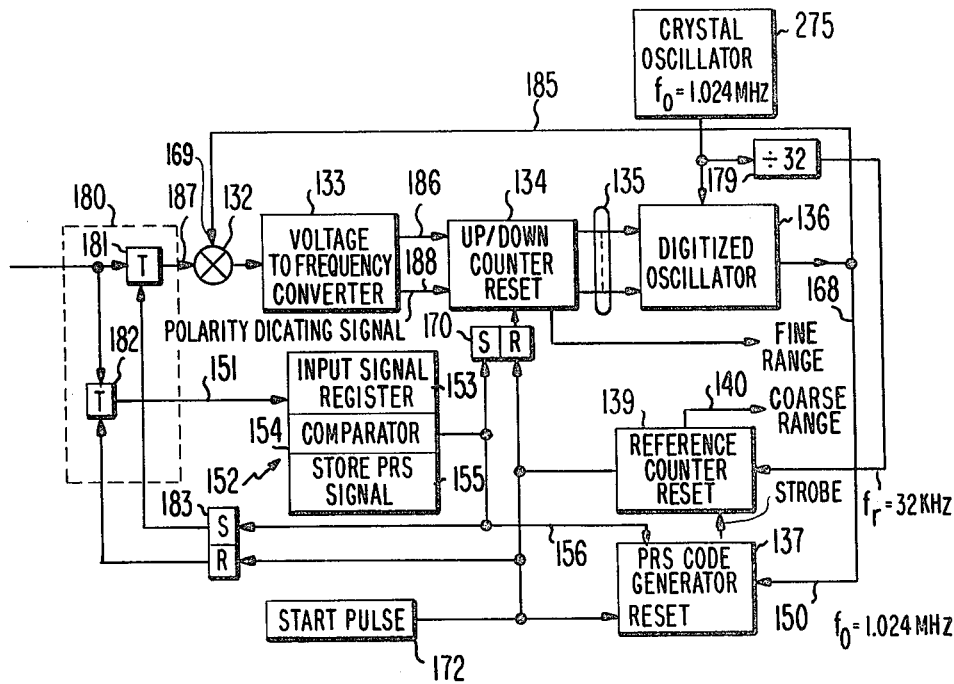
FIG. 3 is a generalized block diagram of an interrogator according to one embodiment of the invention.

In FIG. 3, assume that a received signal of waveform 2E is received at input 187 of a phase detector or comparator 132. Such a signal could come from any source such as a transponder which is part of a range finding system of which the logic of FIG. 3 comprises the interrogator. The transponder, per se, is not a part of the invention except that it must exist to generate and transmit the responsive signal.

In FIG. 3 some necessary parts of an interrogator are not shown, such as an antenna, a demodulator, a receiver, and a transmitter. A more complete interrogation system is shown in FIG. 4, to be described later herein.

Assume further that a PRS code generator 137 and digitized oscillator 136 were used earlier to generate an interrogation signal of the waveform 2D and that the received signal on line 187 is a time delayed form of the interrogation signal (FIG. 2E). Also assume the up/down counter 134 was held at its zero state which will synchronize the phase and frequency of $f_o$ from frequency source 275 and $f_r$ from digitized oscillator 136 during the interrogation. Also assume that the reference counter 139 and PRS generator 137 were initialized by a start pulse from start pulse source 172 and hence maintain a fixed phase relationship during the generation of the interrogation signal. The digitized oscillator 136 is designed and constructed to locally generate the square-wave signal of waveform 2B which is supplied to a second input 169 of phase comparator 132 via lead 185.

When the signal of waveform 2C is first received, the up/down counter 134 is still held to zero count by virtue of the reset condition of flip-flop 170, which reset condition was established at the start of operation of the system by a pulse from start pulse source 172.

Thus, digitized oscillator 136 will produce an output signal having a given constant frequency and phase not affected by up/down counter 134 which is held to zero count in the manner described above.

The 32 KHz output signal of digitized oscillator 136, shown in waveform 2B, is supplied to PRS generator 137. The reference counter 139 is driven from a 32 KHz generator by fixed divider 179. As stated above both the reference counter 139 and the PRS generator 137 were reset to zero condition at the initiation of operation of the system via a pulse from start pulse source 172. The reference counter 139 has a count capacity equal to the number of code chips in the PRS signal generated by generator 137. Therefore, counter 139 will begin its count simultaneously with the beginning of the generation of the PRS signal in generator 137. Such synchronism will be maintained until changed by means to be described later herein. The PRS signal is also stored in a static condition in the store PRS signal register 155 of correlator 152.

TRANSMISSION gates 181 and 182 within dotted block 180 form a switch such that TRANSMISSION gate 182 is enabled and TRANSMISSION gate 181 is disabled when flip-flop 183 is reset. On the other hand when flip-flop 183 is set TRANSMISSION gate 181 is enabled and TRANSMISSION gate 182 is disabled. Flip-flop 183 is reset at the beginning of operation of the system.

Thus, when operation of the circuit is initiated, with flip-flop 183 reset, TRANSMISSION gate 182 will pass the received signal of waveform 2C therethrough and via lead 151 to input signal register 153 of correlator 152. The PRS signal is stored statically in reference register 155 as mentioned above. Thus, when correlation occurs between the stored PRS signal in reference register 155 and the received input signal being entered into input signal 153 a correlation pulse will be supplied from comparator 154 to several destinations. First, it will be supplied to PRS signal generator 137 to set the PRS signal generator to its original state (i.e. the beginning of a PRS signal) regardless of the state of the PRS signal generation existing at the time the correlation pulse occurs. Thus, PRS signal generator 137 will generate a PRS signal that is coarsely synchronized to the PRS signal being received at the input on line 151. Finer phase synchronization will be provided when a 32 KHz phase locked loop is locked up by means including phase comparator 132. After such lock up the reference counter 139 will be strobed by the PRS generator 137 as it goes through its zero count to determine coarse phase change between the PRS component of the original generated signal and the PRS component of the received signal.

The output of comparator 154 also sets both flip-flops 170 and 183. The setting of flip-flop 183 will disable TRANSMISSION gate 182 and enable TRANSMISSION gate 181 to allow the remainder of the received signal to pass through TRANSMISSION gate 181 to phase comparator 132. The setting of flip-flop 170 will remove the reset condition of up/down counter 134 and enable it to count in accordance with the output of voltage-to-frequency converter (V/F) 133.

Also supplied to phase comparator 132, via lead 185, is the 32 KHz basic tone supplied from digitized oscillator 136 where it is compared with the second portion of the received signal, also a 32 KHz signal identified as portion 112 of waveform 2C. Phase comparator 132 will respond to the two 32 KHz tones supplied thereto to produce an error voltage whose magnitude is proportional to the phase difference between such two signals and whose polarity indicates the leading or lagging phase relationship of said two signals. The V/F converter 133 will respond to said error voltage to supply to up/down counter 134 via lead 186 a train of pulses having a frequency proportional to the magnitude of said error voltage supplied thereto from phase comparator 132. The direction of count of up/down counter 134 is determined by a polarity indicating signal also supplied to counter 134 from V/F converter 133 via lead 188. As the up/down counter 134 counts, either up or down, the phase of the output signal from digitized oscillator 136 will be altered by means well known in the art. One such digitized oscillator is described in co-pending application Ser. No. 105,122, now U.S. Pat. No. 4,295,098 filed Dec. 19, 1979 by A. Crowley and entitled "Digitally Adjustable Phase Shifting Circuit" and incorporated herein by reference. Other digitized oscillators whose phase can be changed by digital means, such as the output of up/down counter 134, are well known in the art and will not be described further herein.

When the phase of the 32 KHz output signal from digitized oscillator 136 and the phase of the 32 KHz second portion of the received signal supplied to phase comparator 132 via lead 187 become synchronized, the output signal from V/F converter 133 will become zero so that up/down counter 134 will no longer supply a train of pulses to the digitized oscillator 136. The system will have then become stable and phase synchronization will have been obtained. The fine phase synchronization of the two signals supplied to phase comparator 132 will then be represented by the count in up/down counter 134.

In summary, the determination of the phase difference between the locally generated PRS signal in generator 137 and the received PRS signal establishes a gross phase synchronization between the received and locally generated signal as represented by the count in counter 139 at the time of the PRS strobe. For fine phase synchronization on the level of the individual cycles of the 32 MHz tone, a phase lock loop is employed in the system. Such loop includes phase comparator 132, V/F converter 133, up/down counter 134, digitized oscillator 136 and then back to phase comparator 132 via lead 185. The fine phase is represented by the count in up/down counter 134 after the loop is synchronized. The gross phase is represented by the count in reference counter 139 at the time of the PRS generation strobe pulse.

Figure 4:
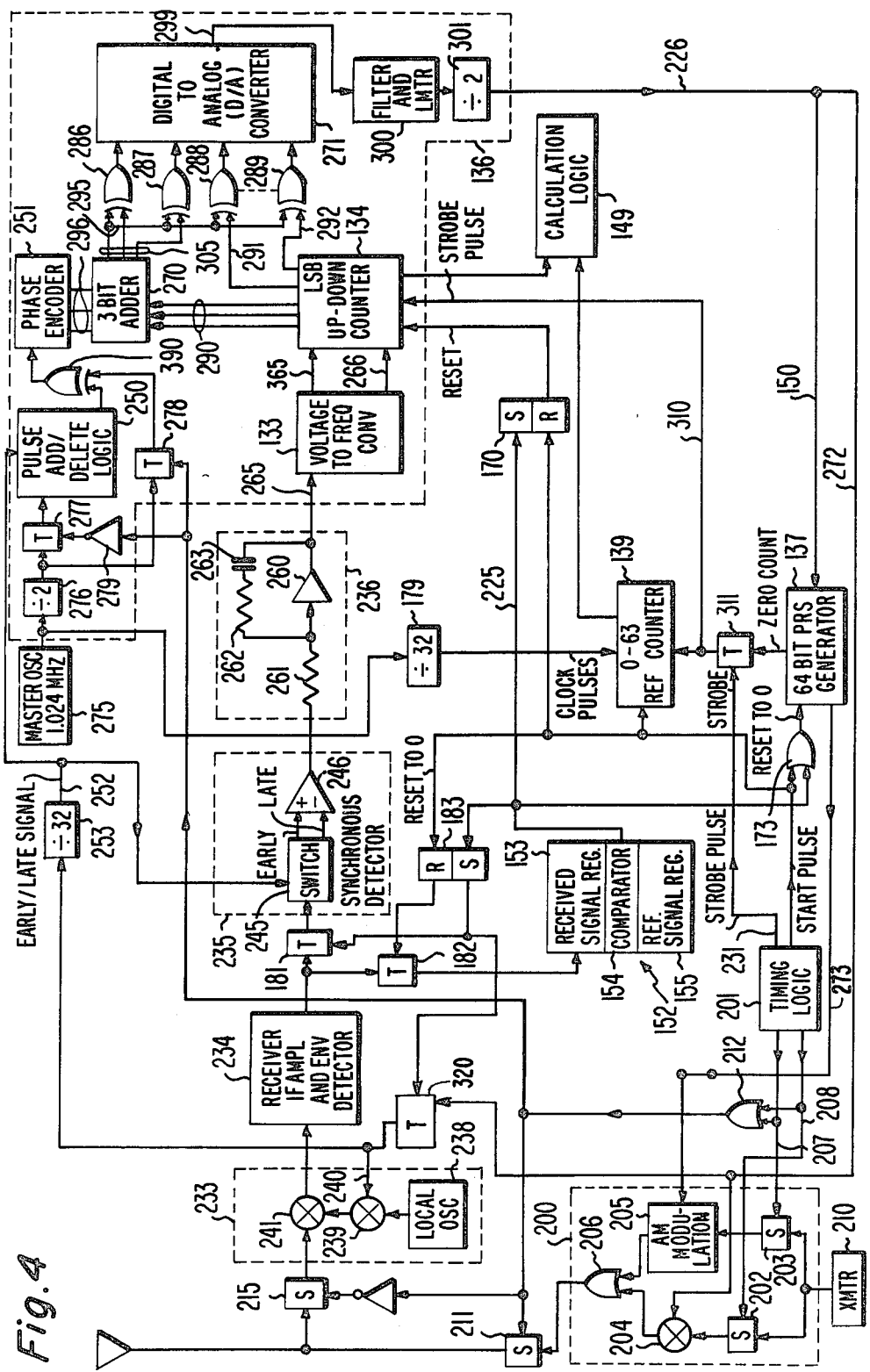
FIG. 4 shows a more complete combined block and logic diagram of the invention of FIG. 3.

Referring now to FIG. 4 there is shown a more detailed diagram of the invention with additional logic to accomplish additional functions. More specifically, in FIG. 4 logic has been added to show means for modulating the interrogation signal to be transmitted, both in the amplitude modulated (AM) and phase shift keyed (PSK) modes, logic for receiving and demodulating the signal from the transponder, logic for early/late phase shifts in the locally generated signal to ensure better phase synchronization with the received signal, and timing and gating logic for switching various portions of the system in accordance with which portions of the signal to be transmitted are to be generated and in accordance with which portions of the received signal are being received.

Consider first the similarities between the logic of FIGS. 3 and 4 in which corresponding elements are identified by the same reference characters. Thus, in FIG. 4 the logic within dotted block 136 corresponds to the digitized oscillator 136 of FIG. 3. Correlator 152 of FIG. 4 corresponds to correlator 152 of FIG. 3, flip-flops 170 and 183 of FIG. 4 correspond to flip-flops 170 and 182 of FIG. 3. TRANSMISSION gates 181 and 182 and frequency divider 179 of FIG. 4 correspond to similarly identified elements in FIG. 3. Reference counter 139 and PRS generator 137 of FIG. 4 correspond to similarly identified elements in FIG. 3.

The logic within block 200 of FIG. 4 consists of switches 202 and 203 which, under control of timing logic 201, supply the output of transmitter 210 either to mixer 204 or AM modulator 205, the outputs of which are then summed through combiner 206 to switch 211. Switch 211 is enabled via OR gate 212 during those times that either of switches 202 or 203 is enabled. After the transmission of the interrogation signal the output of OR gate 212 goes to its low level to disable switch 211 and enable switch 215, thereby preparing the system for the reception of the responsive signal from a transponder (not shown in FIG. 4).

Waveform A of FIG. 5 shows the transmission of the AM portion of the transmitted signal which occurs during the time period $t_0-t_1$ as identified by bar waveform 216. During time period $t_0-t_1$ the switch 203 of FIG. 4 is enabled. At time $t_1$ switch 203 is disabled by timing logic 201 and switch 202 is enabled and remains enabled until time $t_2$. During time period $t_1-t_2$ the PSK portion of the signal is transmitted as shown by bar waveform 217 of waveform B of FIG. 5. At time $t_2$ the timing logic 201 disables both switches 202 and 203 and also switch 211, which was enabled during the entire time period $t_0-t_2$. Also at time $t_2$ the switch 215 is enabled to receive the signal transmitted from the trasponder.

The bar waveform 218 of waveform C in FIG. 5 represents the state of enablement of the receiver portion of the system. Sometime later, at time $t_3$, the AM portion of the signal from the transponder arrives at the interrogator as represented by bar waveform 219 of waveform D in FIG. 5. Assume that at time $t_4$ correlation of the PRS signal stored in correlator register 155 and the received PRS signal occurs to produce the correlation pulse 220 as shown in waveform E of FIG. 5. Such correlation pulse will cause several switching events to occur in the system in preparation for the reception of the PSK portion of the responsive signal at time $t_5$ as shown in bar waveform 227 of waveform G in FIG. 5. It should be noted that during the time period $t_4-t_5$ additional PRS signals might be received by the system at a time when the system is prepared to receive the PSK portion of the responsive signal rather than the PRS signal. However, the interval of time $t_4-t_5$ is small and will not upset the gross phase synchronization produced by correlation between the received and locally generated PRS signals and the generation of the correlation pulse therefrom.

Such correlation pulse is generated in comparator 154 of correlator 152 in the manner discussed in connection with FIG. 3 and appears on the output 225 thereof to set flip-flops 183 and 170. The setting of flip-flop 183 disables TRANSMISSION gate 182 and enables TRANSMISSION gate 181, thereby preventing the remainder of the received signal from being supplied to the correlator 152 and enabling it to be supplied to synchonous detector 235. Such remainder of the received signal is essentially the PSK portion thereof. The setting of flip-flop 183 also enables TRANSMISSION gate 320, connecting the 32 KHz signal on lead 272 to mixer 239. The setting of flip-flop 170 enables up/down counter 134 to count up or down in response to the output of V/F converter 133 and thereby to enable the 32 KHz output signal appearing on output lead 226 of digitized oscillator 136 to become phase synchronized with the 32 KHz component of the received PSK signal, represented by bar waveform 227 of waveform 5G.

The correlation pulse on output lead 225 will also reset PRS generator 137 to zero through OR gate 173, thereby grossly synchronizing it to the received signal. Fine synchronization will be obtained after the 32 KHz phase lock loop becomes locked at time $t_6$. At time $t_6$ a strobe signal wide enough to coincide with the zero state of PRS generator 137 will strobe reference counter 139 by enabling TRANSMISSION gate 311 to permit the zero state of PRS generator to pass therethrough. The count in counter 139 at this time will represent the gross phase difference between the previously sent PRS signal and the received PRS signal. Such strobe pulse is shown in waveform 5H as pulse 230. The zero state of PRS generator 137 will simultaneously strobe the contents of the up/down counter 134 via lead 310 to obtain the fine phase resolution between the previously sent 32 KHz signal and the received 32 KHz signal.

Both the gross and the fine phase synchronization indicating signals are then supplied to calculating means 149 of FIG. 4 which will determine the distance between the receiver and the transmitter by well known means.

The means for processing the received signal to produce the unmodulated PRS and the 32 KHz portions comprise the logic within dotted block 233 and receiver 234. Synchronous detector 235 and filter 236 are employed primarily in connection with an early/late signal which will be discussed later.

Returning again to the logic within block 233 a signal from local oscillator 238 is supplied to a first input of a mixer 239. The output of the digitized oscillator 136 is supplied to the other input 240 of mixer 239 to produce an output signal comprising the local oscillator signal phase modulated by the locally generated 32 KHz signal. Such signal is then supplied to a second mixer 241 to which is also supplied the signal received from the transponder. The output of mixer 241 is then a signal comprising first order components of an intermediate frequency modulated by first order components of 64 KHz and of 32 KHz and also a d.c. component proportional to the phase relationship between the locally generated 32 KHz signal and the 32 KHz component of the received signal. As is will known in the art such d.c. component reaches a maximum when the two 32 KHz signals are in phase synchronism or 180° out of phase.

Such output signal from mixer 241 is then supplied via receiver 234 and gate 181 to synchronous detector 235 which is comprised of a switch 245 and a difference amplifier 246.

At this point it is helpful to discuss the logic and the function of the early/late signal. In general, an early/late function involves the alternate advancing (early) and retarding (late) of the phase of the 32 KHz reference signal, in this case the output of digitized oscillator 136, with respect to the received signal. When the phase relationship of the reference signal and the received signal is such that the early and late phase conditions of the reference signal causes the reference signal to alternately lead and lag the phase of the received signal by equal amounts, then the d.c. voltages generated during the early and late phase conditions will be equal. Otherwise such d.c. voltages will be unequal.

By means including pulse add/delete logic 250 and phase encoder 251 in cooperation with an early/late signal generated on output lead 252 of divide-by-32 253, the output of digitized oscillator 136 will be caused to have an early/late phase characteristic. More specifically, the phase of the output of digitized oscillator 136 will be advanced in phase for a period of time determined by the output of divider 253 and then will be retarded for an equal interval of time.

Thus, the output of receiver 234 will be an error voltage whose level will change with each change of the early or late condition of the output of digitized oscillator 136. The difference in level of said error voltages represent the degree of phase difference between the locally generated 32 KHz signal and the received 32 KHz signal. To utilize such difference in level of the two error voltages, synchronous detector 235 and filter 236 are employed. Specifically, the switch 245 of synchronous detector 235 is caused to switch the output of receiver 234 between the positive and negative inputs of difference amplifier 246 during each change in phase due to the early/late function. Thus, during the early phase signal the output of receiver 234 is supplied to the positive input of difference amplifier 246 and during the late phase condition the output of receiver 234 is supplied to the negative input of difference amplifier 246.

The output of difference amplifier 246 is alternately a positive and a negative signal which are supplied to the integrator filter 236. The integrator filter 236, which consists of amplifier 260, input resistor 261, and a feedback circuit consisting of resistor 262 and capacitor 263, functions to integrate the signal supplied thereto from synchronous detector 235 to supply to the V/F converter 133 a d.c. output signal whose amplitude is equal to the difference in the levels of the two d.c. voltages supplied from receiver 234, and whose polarity indicates whether the voltage occurring during the early condition is greater or less than the d.c. voltage occurring during the late condition. The V/F converter 133 responds to such a signal from the integrator filter 236 to generate on output lead 365 a train of pulses having a frequency proportional to the magnitude of the voltage supplied thereto, and to produce on its other output lead 266 a count direction indicating signal indicating count direction in accordance with the polarity of the d.c. signal supplied to the V/F converter 133. Such polarity or count direction indicating signal is supplied to up/down counter 134 which responds thereto to either count up or down a number of counts determined by the rate of the pulses supplied thereto on lead 265. In a manner which will be described later the contents of counter 134 are supplied both to adder 270 and to D/A converter 271 to change the phase of the signal produced by the digitized oscillator 136 of which adder 270 and D/A converter 271 are a part.

When up/down counter 134 has reached a count such that the early/late phase condition of the 32 KHz signal generated by oscillator 136 lies equally on either side of the phase of the received 32 KHz signal the error voltages generated during the early/late conditions will be equal in amplitude but opposite in polarity so that the output of integrator filter 236 will be zero. Phase synchronization will then exist between the locally generated and received 32 KHz signals and the contents of up/down counter 134 will remain constant and will represent the amount of phase shift introduced into the locally generated 32 KHz signal in order to become phase synchronized with the 32 KHz component of the received signal.

As mentioned above, the contents of counter 134 and the count in reference counter 139 at the times PRS generator 137 goes through its zero state are then strobed by a pulse from PRS generator 137 via lead 310 under control of the strobe signal on lead 231 from timing logic 201 to supply the contents of counters 134 and 139 to computing means 149 which then computes the distance between the interrogator and transponder.

The early/late control signal is derived from the output of digitized oscillator 136 which is supplied to the input of divide-by-32 divider 253 via leads 272 and 273. Consequently, the early/late signal consists of alternate periods of early and late phase conditions of the locally generated 32 KHz signal, each period consisting of sixteen cycles of said 32 KHz signal. The output of divider 253, which is the early/late control signal is supplied both to pulse add/delete logic 250 and to switch 245 of synchronous detector 235.

Consider further the function and operation of the digitized oscillator 136 which is described in detail in aforementioned co-pending application Ser. No. 105,122. While the digitized oscillator of the above-mentioned application is particularly suited for application in the present invention other digitized oscillators are also suitable. A brief description of such digitized oscillator will be set forth below.

A master oscillator 275 generates a 1.024 MHz signal which is divided by two in divider 276 to produce a 512 KHz signal. During reception of the signal from a transponder (not shown) such 512 KHz signal is supplied to pulse add/delete logic 250 through TRANSMISSION gate 277 which is enabled at that time by the output of OR gate 212 supplied to TRANSMISSION gate 277 through inverter 279. During the transmit portion of the system it is not desired that the signal have an early/late phase characteristic. Accordingly, during the transmit portion of the system, TRANSMISSION gate 278 is enabled and TRANSMISSION gate 277 is disabled.

Consider first the transmit portion of the operation when TRANSMISSION gate 278 is enabled. The 512 KHz signal from divider 276 is supplied through TRANSMISSION gate 278 and exclusive OR gate 390 to phase encoder 251 which is a divide-by-8 divider. The phase encoder 251 is active to vary phase only when the early/late signal is employed in the system, i.e. when the pulse add/delete logic 250 is active in the system during the receive portion of the operation.

The divide-by-8 phase encoder 251 cycles repeatedly from 0 through 7, the instantaneous count appearing on the three output leads 296 thereof. Such leads 296 supply the contents of phase encoder 251 to adder 270 which is constructed to pass the sum of counts on leads 296 and 290 therethrough to its three output terminals 305, i.e. the value contained in up/down counter 134 will be added to the binary value supplied to adder 270 by phase encoder 251 via three leads 290 which carry the three most significant bits of up/down counter 134.

Thus, for example, if adder 270 receives a value of six from phase encoder 251 and up/down counter 134 contains a 1, then adder 270 will output in binary form a value of 6+1=7 to D/A converter 271.

As will be seen later in a more detailed description of adder 270, the supplying of a 1 to the least significant input of adder 270 from up/down counter 134 represents a phase shift of 360°/8=45° since the total capacity of adder 270 is 8.

For the present discussion, however, it has been assumed that digitized oscillator 136 is operating during the transmit portion of the system and that up/down counter 134 is therefore reset to zero by a binary 1 being supplied to the reset input thereof from flip-flop 170. Thus, in the absence of any provision to the contrary, phase encoder 251 will generate binary signals ranging from binary 000 to binary 111 and then will overflow back to or through binary 000 again, thus producing binary values which represent a sawtooth waveform in that they rise from 0 to a given level, then plunge to a value near 0, and then start counting over again.

It is desired that the output of the adder 270 be converted to a triangularly shaped waveform rather than a sawtooth waveform in order to reduce unwanted frequency components. To produce such a triangular shaped waveform the most significant bit position of the output of adder 270, which in fact is lead 295 thereof, is connected to one input of all the Exclusive OR gates 286, 287, 288, and 289. Thus, up to a value of 011 in adder 270 (the least significant bit being at the right), the most significant bit (at the left) will be a binary 0 and Exclusive OR gates 286–289 will output whatever binary value is supplied to the other input lead thereof since equal values supplied to the two inputs of an Exclusive OR gate results in a 0 output and unequal input signals results in a binary 1 output. Thus, for example, if the most significant bit is a 0, then a binary 0 supplied to the other input of any of Exclusive OR gates 286–289 will appear as a 0 at the output thereof. If a binary 1 is supplied to the other input of any of Exclusive OR gates 286–289 then the input signals are of unequal levels and the output thereof will be a binary 1.

When another binary 1 is added into adder 270 its contents will change from 011 to 111 with the most significant bit changing to a binary 1 so that whatever binary value is supplied to the said other inputs of the Exclusive OR gates will be inverted by said Exclusive OR gates and appear as the opposite binary value on the output thereof. For example, if a binary 1 is supplied to the other input of Exclusive OR gate 286 then the signal levels of both inputs are equal and the output is a binary 0.

Reference is made to the charts of FIGS. 6 and 8 and the waveforms of FIGS. 7 and 9. FIGS. 6 and 8 are respectively a pair of truth tables showing the total binary value outputs of the three Exclusive OR gates 286, 287 and 288 when a binary 0 is supplied to Exclusive OR gates 288 through 289 from up/down counter 134 via leads 291 through 292 and when a binary 1 is supplied on leads 291 through 292 thereto from counter 134.

Consider first the truth table of FIG. 6 which contains four columns identified as Columns I-IV. Column I shows the output of Exclusive OR gate 288 which is the least significant bit of the three outputs being considered. The most significant bit is the output from Exclusive OR gate 286 shown in Column III and the second most significant bit position is the output from the Exclusive OR gate 287 shown in Column II.

It is to be understood as discussed above that the most significant bit from adder 270, not to be confused with the most significant bit in Column III of the truth table of FIG. 6, is connected to one input of each of the three Exclusive OR gates 288, 287, and 286. The outputs of said three Exclusive OR gates 286–288 are designated as $e_{288}$, $e_{287}$, and $e_{286}$ in the truth table of FIG. 6.

In FIG. 6 it is assumed that a binary 0 is supplied from counter 134 via lead 291 to one input of Exclusive OR gate 288 and that such binary 0 does not change during the transmit portion of the operation of the system. Since the most significant bit of the output of adder 270 is supplied to the other input of Exclusive OR gate 288, the output of said Exclusive OR gate 288 will follow the level of the most significant bit from adder 270. Such most significant bit will be a 0 during the first four counts of phase encoder 251 which are supplied to adder 270 and then will change to a binary 1, as shown in the truth table of FIG. 6, for the remaining four counts of the one cycle of phase encoder 251. During the time that the contents of the most significant bit position of adder 270 is a binary 0 the output of Exclusive OR gate 288 will be a binary 0. During the last four counts of each cycle of phase encoder 251 the contents of the most significant bit position will be a binary 1 and so the output of Exclusive OR gate 288 will also be a binary 1. By similar analysis the states of each of the outputs of Exclusive OR gates 287 and 286 can be determined to be as shown in the truth table of FIG. 6. In Column IV there is shown the decimal value of the collective outputs of the three Exclusive OR gates 286–288 and can be seen to rise in increments of 2 to the value of 6, then rise one increment to a value of 7, and then descend in increments of 2, to 5, to 3, and then to 1.

The analog value of the binary output of the three Exclusive OR gates 286–288 is shown in the waveform of FIG. 7 and can be seen to be a triangularly shaped waveform which repeats iteratively as long as the system is operating and as long as there is no output from up/down counter 134.

If a binary 1 is supplied from up/down counter 134 via lead 291 to one input of Exclusive OR gate 288, then the output of Exclusive OR gate 288 will be as shown in Column I of FIG. 8 where it can be seen to have a value of binary 1 for the first four output counts of phase encoder 251 since the value on output 291 of up/down counter 134 is a binary 1 for the first four counts of phase encoder 251. During the second four counts of the cycle of phase encoder 251 the output of the Exclusive OR gate 288 is a binary 0 since the signals supplied to the two inputs thereof are both high, i.e. a binary 1. The binary values of the outputs of the two Exclusive OR gates 287 and 286 are the same as shown in the truth table of FIG. 6 since the inputs thereto cycle through the same values. The waveform of the values shown in the truth table of FIG. 8 is shown in FIG. 9 and can be seen to correspond to the decimal values in Column IV of the truth table of FIG. 8.

A comparison of the waveforms of FIG. 7 and FIG. 9, both of which have the same x axis time scale relative to the beginning of the count of phase encoder 251 of FIG. 4, reveals that the waveform of FIG. 9 has phase shifted to the left of the waveform of FIG. 7. Such shift in phase is due to the addition of the binary 1 on line 291 from up/down counter 134 to an input of Exclusive OR gate 288, as discussed above, and represents a phase shift of the waveform of FIG. 9 with respect to that of FIG. 7 of 360°/8 or 45°. If a binary 1 were to be generated by the next least significant bit position of counter 134 a phase shift of 22½° would be produced.

Thus it can be seen that by supplying counts from up/down counter 134 directly to the Exclusive OR gates, such as Exclusive OR gate 288, the phase of the output signal from the digitized oscillator 136 can be shifted. Increasingly finer phase shifts can be obtained by increasing the number of positions in the digital-to-analog converter 271 to a larger number. For example, if the D/A converter 271 had eleven bit positions it would be possible to divide the phase into a precision equal to $360°/2^{12}$. Also, the phase shift can be positive or negative depending upon whether counter 134 counts up or down.

It is to be noted that supplying binary 1's from counter 134 to Exclusive OR gates, such as Exclusive OR gates 288 and 289, can never change the phase of the signal generated by the digitized oscillator 136 by more than 45°. To change the phase by more than 45° it is necessary to supply binary signals directly to adder 270 which are then added to the binary values supplied to adder 270 from phase encoder 251. The foregoing is accomplished by the three leads 290 which function to supply the three most significant bits of counter 134 to adder 270 where they are added to the values supplied from the outputs 296 of phase encoder 251. A binary 1 on the most significant bit output of the counter 134 will function to shift the phase of the signal supplied to the adder 270 from phase encoder 251 by 180°. A binary 1 on the next most significant output bit position of counter 134 will shift the phase of the signal supplied thereto from phase encoder 251 by 90°, and a binary 1 on the next most significant bit position of counter 134 will shift the phase of the signal from phase encoder 251 by 45°.

What is claimed is:

1. An interrogator for use in a range finding system comprising interrogator means and transponder means for generating and transmitting an interrogation signal having a first encoded portion and a first basic tone portion and a responsive signal having a second encoded portion and a second basic tone portion, in which said transponder means responds to said interrogation signal to generate and transmit said responsive signal with said second encoded and basic tone portions thereof being phase synchronous with said first encoded and basic tone portions as received at said transponder means, and in which said interrogator means comprises:

signal generating means for generating said interrogation signal and for storing the phases of said first encoded and basic tone portions of said interrogation signal;

first means for determining the difference between the stored phase of said first encoded portion of said interrogation signal and the phase of said second encoded portion of the received responsive signal;

second means for determining the difference between the stored phase of said first basic tone of said interrogation signal and the phase of said second basic tone portion of the received responsive signal to produce a first signal whose frequency is proportional to said phase difference and a second signal indicating the leading or lagging phase relationship of said first and second basic tones;

up/down counter means constructed to count at a rate determined by the frequency of said first signal and in a direction determined by said second signal; and said signal generating means comprising means responsive to the count in said up/down counter means to alter the stored phase of said first basic tone portion towards synchronization with the phase of said received second basic tone until phase synchronization is attained.

2. An interrogator as in claim 1 in which:

said signal generating means further comprises a means for early/late phase modulation of the phase of said first basic tone portion of said interrogation signal about a given nominal center phase and at a given repetition rate during the reception of said received responsive signal;

and in which said second means comprises:

phase comparing logic responsive to said first basic tone portion with said early/late phase modulation and said received second basic tone to produce first and second d.c. voltages alternately at said given repetition rate whose magnitudes and polarities are indicative of the magnitude and polarity of the phase differences between said first basic tone portion and said second basic tone portion during the early and late phase conditions, respectively;

filter means for producing a third d.c. voltage whose magnitude and polarity are indicative of the magnitude and polarity of the difference between said first and second d.c. voltages; and voltage-to-frequency converter means responsive to said third d.c. voltage to produce said first signal.

3. An interrogator as in claim 1 in which said first means comprises:

correlation means having a reference signal register for statically storing said first encoded portion, a received signal register for dynamically storing the received second encoded portion and a means for comparing the correlation between the statically stored first encoded portion and the received second encoded portion to produce a correlation pulse when correlation occurs;

means for iteratively generating said first encoded portion during the reception of the responsive signal and with its phase unchanged from that existing during the generation of said interrogation signal; and means responsive to said correlation pulse to detect and store the phase of said continuing first encoded portion at the time of said correlation pulse.

4. An interrogator as in claim 1 in which said first means for storing the phase of said first basic tone portion of said interrogation signal comprises means for continuing the generation of said first basic tone with its phase unchanged after the generation and transmission of the interrogation signal and until reception of said second basic tone and phase synchronization therewith begins.

5. An interrogator as in claim 1 comprising:

calculation means responsive to the difference between the stored phase of said first encoded signal portion and the phase of said received encoded portion and to the count contained in said up/down counter means after phase synchronization between said altered stored phase and the phase of said received second basic tone portion has been attained to calculate the distance between said interrogator and said transponder.

6. An interrogator system as in claim 1 and further comprising:
means responsive to the determination of the difference between the stored phase of said first encoded signal portion and the phase of said second encoded portion of the received responsive signal and to the amount of alteration of said stored phase of said first basic tone portion required to attain phase synchronization with said received second basic tone to calculate the distance between said interrogator means and said transponder means.

7. A system for phase synchronizing a locally generated first signal with a received signal and comprising:
signal generating means for generating said first signal;
phase comparator means responsive to said first and received signals to produce an error voltage whose amplitude is proportional to the phase difference between said first and received signals and whose polarity is indicative of the leading or lagging phase relationship between said first and received signals;
means responsive to said error voltage to produce a control signal having a variable frequency which varies in response to the amplitude of said error voltage; and
up/down counter means responsive to said control signal to count at a rate proportional to the frequency thereof and in a direction determined by the polarity of said error voltage;
said signal generating means directly responsive to the count in said up/down counter means to alter the phase of said first signal to become synchronous with the phase of said received signal.

8. A system as in claim 7 in which:
said signal generating means comprises a means for early/late phase modulation of the phase of said first signal about a given nominal center phase and at a given repetition rate during the reception of said received signal;
and in which said phase comparator means is responsive to said first signal with said early/late phase modulation and said received signal to produce first and second error voltgages alternately at said given repetition rate whose magnitudes and polarities are indicative of the magnitude and direction of the phase differences between said first signal and said received signal during the early and late phase conditions, respectively;
filter means for producing a third error voltage whose magnitude and polarity are indicative of the magnitude and polarity of the difference between said first and second error voltages; and
voltage-to-frequency converter means responsive to said third error voltage to produce said control signal.

* * * * *

UNITED STATES PATENT AND TRADEMARK OFFICE
CERTIFICATE OF CORRECTION

PATENT NO. : 4,370,653

DATED : 1-25-83

INVENTOR(S) : Albert Timothy Crowley

It is certified that error appears in the above-identified patent and that said Letters Patent is hereby corrected as shown below:

Col. 7, line 10, "182" first occurrence should be --183--.

Col. 8, line 45, after "239" insert --via lead 273--.

Signed and Sealed this

Twelfth Day of July 1983

[SEAL]

Attest:

GERALD J. MOSSINGHOFF

Attesting Officer     Commissioner of Patents and Trademarks